(12) United States Patent
Wald et al.

(10) Patent No.: US 10,191,292 B2
(45) Date of Patent: Jan. 29, 2019

(54) APPARATUS AND METHOD FOR LIGHT MODULATION

(71) Applicants: Carl Zeiss Microscopy GmbH, Jena (DE); Carl Zeiss AG, Oberkochen (DE)

(72) Inventors: Matthias Wald, Jena (DE); Christoph Husemann, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 90 days.

(21) Appl. No.: 15/192,199

(22) Filed: Jun. 24, 2016

(65) Prior Publication Data

US 2016/0377875 A1 Dec. 29, 2016

(30) Foreign Application Priority Data

Jun. 29, 2015 (DE) .................. 10 2015 110 449

(51) Int. Cl.
| | |
|---|---|
| *G02B 27/14* | (2006.01) |
| *G02B 21/06* | (2006.01) |
| *G02B 27/10* | (2006.01) |
| *G02B 21/00* | (2006.01) |

(52) U.S. Cl.
CPC ....... *G02B 27/141* (2013.01); *G02B 21/0052* (2013.01); *G02B 21/06* (2013.01); *G02B 27/1006* (2013.01); *G02B 2207/117* (2013.01)

(58) Field of Classification Search
CPC .... G02B 21/06; G02B 21/0076; G02B 21/16; G02B 21/0032; G02B 21/367; G02B 21/26; G02B 21/008; G02B 21/361; G02B 21/14; G02B 27/58; G02B 21/0048; G02B 21/34; G02B 21/025; G02B 21/0072; G02B 21/002; G02B 21/0044; G02B 21/08
See application file for complete search history.

(56) References Cited

U.S. PATENT DOCUMENTS

| | | | |
|---|---|---|---|
| 5,300,942 A | 4/1994 | Dolgoff | |
| 5,897,190 A | 4/1999 | Takahashi | |
| 6,052,214 A | 4/2000 | Chuang et al. | |
| 7,499,218 B1 * | 3/2009 | Liao | G02B 5/04 |
| | | | 353/31 |
| 8,270,067 B1 | 9/2012 | Hsieh et al. | |
| 2007/0058182 A1 * | 3/2007 | Huibers | G02B 26/0841 |
| | | | 358/1.9 |
| 2014/0027616 A1 * | 1/2014 | Twede | H04N 5/378 |
| | | | 250/208.1 |
| 2014/0368904 A1 | 12/2014 | Moertelmaier et al. | |

FOREIGN PATENT DOCUMENTS

| | | |
|---|---|---|
| DE | 4431749 A1 | 3/1995 |
| DE | 102004015586 A1 | 10/2004 |
| JP | H0772443 A | 3/1995 |
| JP | H0772478 A | 3/1995 |

(Continued)

*Primary Examiner* — Thomas K Pham
*Assistant Examiner* — Sharrief Broome
(74) *Attorney, Agent, or Firm* — Murphy, Bilak & Homiller, PLLC

(57) ABSTRACT

In order to modulate different spectral components of a light beam independently of one another, the light beam is split into a plurality of spectral components which can be modulated at different locations of a spatial light modulator.

18 Claims, 5 Drawing Sheets

(56) References Cited

FOREIGN PATENT DOCUMENTS

| | | | |
|---|---|---|---|
| JP | 2003140266 | A | 5/2003 |
| JP | 2008310190 | A | 12/2008 |
| JP | 2009180908 | A | 8/2009 |
| JP | 2012047632 | A | 3/2012 |
| JP | 2012093523 | A | 5/2012 |
| JP | 2012185357 | A | 9/2012 |
| JP | 2014089340 | A | 5/2014 |
| JP | 2015510150 | A | 4/2015 |
| WO | 9920054 | A1 | 4/1999 |
| WO | 2007046710 | A1 | 4/2007 |

\* cited by examiner

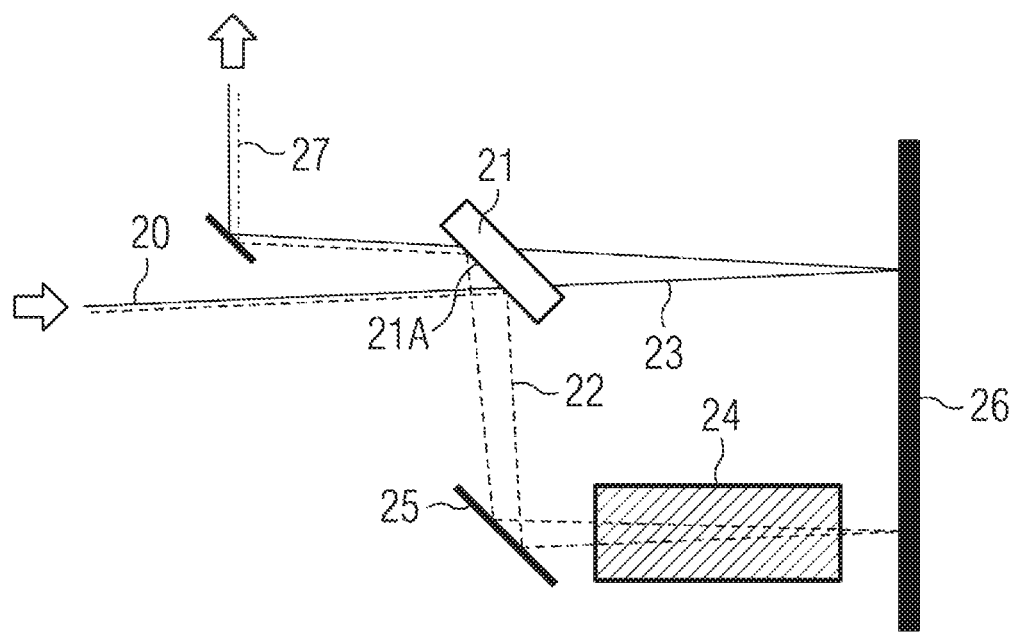

APPARATUS AND METHOD FOR LIGHT MODULATION

FIELD

The present application relates to apparatuses and methods for light modulation. In particular, the present application relates to such methods and apparatuses in which different spectral components of light can be modulated separately.

BACKGROUND

Light modulators generally serve to modulate an incident light beam. Such a modulation may be performed for example with regard to a phase of the light beam and/or with regard to an intensity (amplitude) of the light beam. In the case of some applications, for example for beam shaping, it is desirable to be able to modulate different spectral components of a light beam (for example red, green and blue spectral components) separately from one another.

SUMMARY

In accordance with a first aspect, a modulation device for modulating a light beam is provided, comprising: a spectral splitter to split an input beam into at least two partial light beams having different spectral ranges, a spatial light modulator, an optical device to direct the at least two partial light beams to different locations of the spatial light modulator, wherein the spatial light modulator is configured to modulate the at least two partial light beams, wherein the optical device is further configured to direct the at least two partial light beams after modulation from the spatial light modulator to the spectral splitter, wherein the spectral splitter is further configured to combine the at least two partial light beams after modulation to form an output light beam.

Consequently, a simple modulation of different spectral components of a light beam can be performed by using a single spatial light modulator. The spectral splitter may have a single spectral splitter component, which then serves both for splitting into partial light beams and for combining the partial light beams. However, an arrangement of a plurality of spectral splitter components disposed in series may also be used, e.g. for generating a larger number of partial light beams, wherein the arrangement then serves both for splitting into partial light beams and for combining the partial light beams.

The spatial light modulator may be configured to modulate amplitude and/or phase of the at least two partial light beams independently of one another.

The modulation device may further comprise a component, in particular a separate component (with no other function), to match optical path lengths of the at least two partial light beams.

The modulation device may be configured such that optical path lengths for the at least two partial light beams are identical without provision of (in particular separate) components for balancing optical path lengths.

By virtue of such a construction, for example a separate element for matching light paths is not necessary, and/or a compact construction can be achieved.

The light paths of the partial light beams may be functionally identical, that is to say that the partial light beams pass through identical paths in identical materials (e.g. glass, air, etc.), which leads to identical optical path lengths without further components, and the partial light beams are influenced by identical optical components (e.g. mirrors). A difference thus arises here merely in terms of a possibly different modulation of the partial light beams by the spatial light modulator.

The optical device may comprise mirrors which are arranged substantially symmetrically relative to an axis through the spectral splitter and the spatial light modulator. In this case, substantially symmetrically may mean that mirrors which are substantially symmetrical with respect to one another are at a distance from the axis which differs by not more than 20%, e.g. by not more than 10%, and/or the alignment of the mirrors is symmetrical with respect to one another with a deviation of not more than +/−15°, e.g. not more than +/−10°. In this case, the symmetry property relates, in particular, to optically used parts of the mirrors. In other embodiments, "substantially symmetrically" may mean "symmetrically within the manufacturing tolerances". In other embodiments, asymmetrical mirror arrangements may also be used.

At least two of the at least two partial light beams may pass through the modulation device in mutually opposite directions.

The optical device may comprise a first mirror and a second mirror, and the at least two partial light beams may comprise a first partial light beam and a second partial light beam, wherein the first mirror is arranged to direct the first partial light beam from the spectral splitter to the spatial light modulator and to direct the second partial light beam after modulation from the spatial light modulator to the spectral splitter, wherein the second mirror is arranged to direct the second partial light beam from the spectral splitter to the spatial light modulator and to direct the first partial light beam after modulation from the spatial light modulator to the spectral splitter.

The optical device may be designed such that an angle of incidence of the at least two partial light beams on the spatial light modulator and/or on the spectral splitter is less than 20°.

The angle of incidence may be in particular less than 10°.

Such small angles of incidence may be advantageous particularly if a high efficiency of the spectral splitter is necessary, for example in the case of low signal strength.

The spectral splitter may comprise a dichroic spectral splitter.

In this case, the spectral splitter may have on a side a dichroic layer which reflects light in a spectral range and transmits light outside the spectral range.

The spectral splitter may also have a first dichroic layer on a first face thereof and a second dichroic layer on a second face thereof, wherein the first dichroic layer reflects in a different spectral range than the second dichroic layer.

In addition, an illumination device for illuminating an object is provided, comprising a light source and a modulation device as described above.

Moreover, a microscope apparatus comprising a modulation device as described above and/or an illumination device as described above is provided.

In accordance with a second aspect, a method for light modulation is provided, comprising: splitting light into a plurality of partial light beams having different spectral components, directing the partial light beams to different locations on a spatial light modulator, independently modulating the partial light beams by the spatial light modulator, and combining the modulated partial light beams.

In this case, directing the partial light beams and combining the partial light beams may be performed in such a way that at least two of the partial light beams travel along light paths in opposite directions.

The method may be carried out with a modulation device as described above.

BRIEF DESCRIPTION OF THE DRAWINGS

For further explanation, various embodiments of the invention are explained in greater detail below with reference to the accompanying drawings. In the figures:

FIG. 2 shows a diagram of a light modulation device in accordance with a further embodiment.

DETAILED DESCRIPTION

Various embodiments of the present invention are explained in detail below. These embodiments serve merely for illustration and should not be interpreted as restrictive. In particular, a description of embodiments with a plurality of elements should not be interpreted to the effect that all these elements are necessary for implementing embodiments. Rather, other embodiments may have fewer elements and/or alternative elements. Moreover, further elements, for example elements conventionally used in optical arrangements, may be provided in addition to the elements illustrated. Elements of different embodiments can be combined with one another, unless indicated otherwise. Variations, modifications and details which are described for one of the embodiments may also be applicable to other embodiments.

The embodiments discussed below comprise spatial light modulators. A spatial light modulator should be understood to mean a device embodied integrally, in particular, in which light incident on different sides of the spatial light modulator can be modulated in different ways. Such spatial light modulators may be constructed in a translationally invariant fashion within their extent, that is to say may consist of a multiplicity of elements of identical type which are arranged offset with respect to one another. In this case, in the context of this application, the term spatial light modulator is used both for spatial light modulators which perform a phase modulation and for spatial light modulators which modulate an amplitude of the light, and also combinations thereof. Light modulators which modulate the phase may be constructed for example on the basis of liquid crystals, for example so-called LCOS-SLM (liquid crystal on silicon spatial light modulator). One example of a spatial light modulator which modulates the amplitude is a digital micromirror arrangement (DMD, abbreviation of "digital micromirror device"). In the context of the present invention, however, other types of spatial light modulators may also be used.

Figure 1:
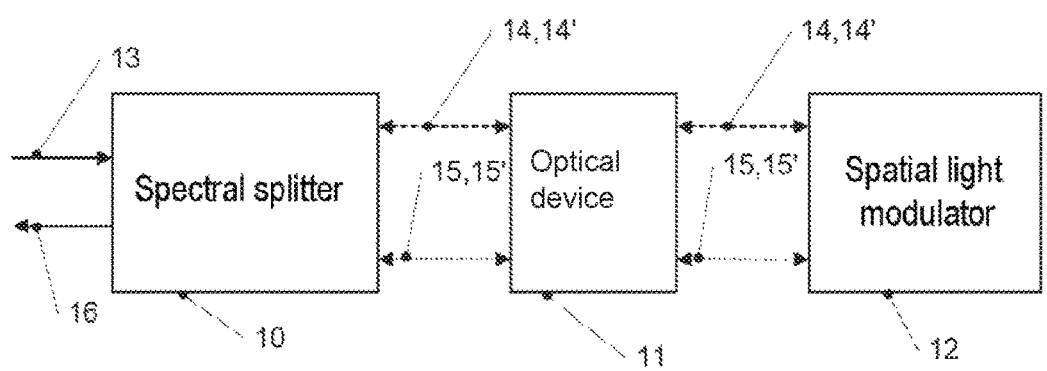
FIG. 1 shows a block diagram of a light modulation device in accordance with one embodiment.

FIG. 1 illustrates a block diagram for elucidating the basic functioning of various embodiments. In the embodiment in FIG. 1, a light beam 13 is directed onto a spectral splitter 10. The spectral splitter 10 splits the light beam 13 into at least two different partial light beams having different spectral ranges (i.e. components having different wavelength ranges) 14 and 15, which are directed by an optical device 11 to individual locations of a spatial light modulator 12. It should be taken into consideration that a spectral range for the individual partial light beams may be either a narrowband spectral range (for example substantially a single wavelength) or else a wider spectral range including an interval of wavelengths.

Since the partial light beams 14, 15 are incident on the spatial light modulator 12 at different locations, they may be modulated in different ways (by the driving of corresponding parts of the spatial light modulator). From the spatial light modulator, the partial light beams 14', 15' thus modulated are directed via the optical device 11 back to the spectral splitter 10, where they are combined to form a single output beam 16. For this purpose, the optical device 11 may comprise various optical elements such as, for example, lenses and/or mirrors. Moreover, the optical device 11 may contain elements which ensure that an optical path length for the partial light beam 14, 14' is equal to a wavelength for the component 15, 15'. For this purpose, for example, one of the partial light beams 14, 14' or 15, 15' may simply be directed through a suitable material having a different reflective index from air in order to match the optical path lengths to one another.

With a construction as illustrated in FIG. 1, a simple modulation of different spectral components of the light beam 13 may be performed. In particular, only a single spatial light modulator and a beam splitter and also the optical device 11 are required. Implementation possibilities therefore will now be described below with reference to FIGS. 2 to 5.

FIG. 2 shows a modulation device in accordance with one embodiment. It comprises as spectral splitter a dichroic component 21 having on a side 21A a dichroic coating, for example, which, from an incident light beam 20, reflects a first partial light beam 22 in a first spectral range and transmits a second partial light beam 23 in a second spectral range. The dichroic component 21 may be configured as a thin-film interference filter or other interferometer in a manner known per se.

The second partial light beam 23 passes onto a spatial light modulator 26 at a first location, while the first partial light beam 22 is directed via a mirror 25 to a second location of the spatial light modulator 26, in order in each case to be modulated there. The partial light beams that can thus be modulated independently of one another by the spatial light modulator 26 pass back to the dichroic component 21 substantially via the opposite light path to that illustrated and are combined to form an output light beam 27 and are coupled out via a mirror 28. The dichroic component 21 thus serves both for splitting into partial light beams and for combining the partial light beams.

Since, in the example illustrated, the path length covered by the first partial light beam 22 is greater than the path length covered by the second partial light beam 23, an element 24 for matching the optical path lengths, for example a glass element, is arranged in the path of the first partial light beam 22.

Figure 3A:
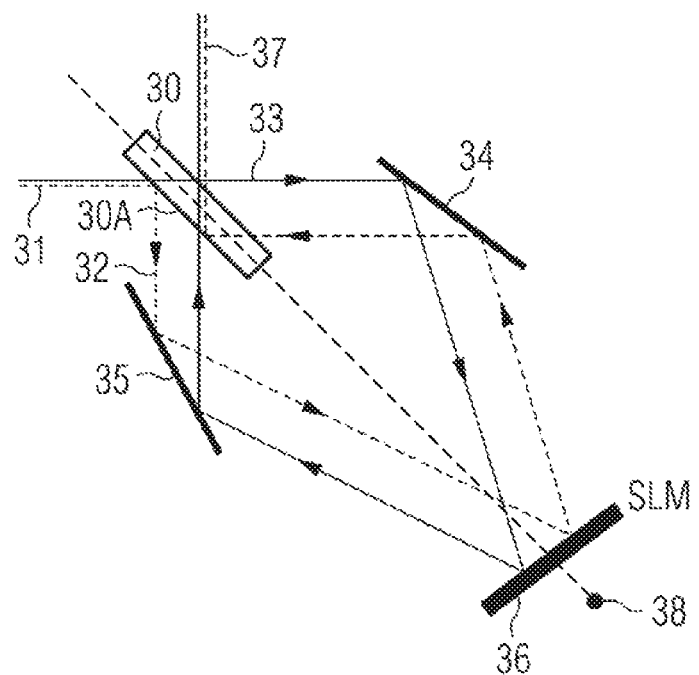
FIG. 3A shows a diagram of a light modulation device in accordance with a further embodiment.

A further embodiment is illustrated in FIG. 3A.

In the embodiment in FIG. 3A, an incident light beam 31 impinges on a dichroic component 30, which, in a manner similar to the dichroic component 21 in FIG. 2, has on a side 30A a coating which splits the light beam 31 into a first partial light beam 32 in a first spectral range and a second partial light beam 33 in a second spectral range. The first partial light beam 32 is directed via a mirror 35 to a first location on a spatial light modulator 36, and the second partial light beam 33 is directed via a mirror 34 to a second location on the spatial light modulator 36. The modulated first partial light beam is then directed back to the dichroic component 30 via the mirror 34 and is combined there with the modulated second partial light beam, which is directed back to the dichroic component 30 via the mirror 35, to form an output light beam 37.

As evident in FIG. 3A, the construction is approximately symmetrical with respect to an axis 38, and the first partial light beam 32 and the second partial light beam 33 pass through the arrangement in opposite directions (in the example illustrated, the first partial light beam 32 passes through the arrangement in the anticlockwise direction, and the second partial light beam 33 in the clockwise direction). In this case, the mirrors 34, 35 are used both for deflecting the first partial light beam and for deflecting the second partial light beam. In this case, substantially symmetrically may mean that mirrors 34, 35 which are substantially symmetrical with respect to one another are at a distance from the axis 38 which differs by not more than 20%, e.g. by not more than 10%, and/or the alignment of the mirrors 34, 35 is symmetrical with respect to one another with a deviation of not more than +/−15°, e.g. not more than +/−10°. In this case, the symmetry property relates, in particular, to optically used parts of the mirrors, i.e. those parts of the specularly reflective surface which are also actually used. In other embodiments, "substantially symmetrically" may mean "symmetrically within the manufacturing tolerances".

In the embodiment in FIG. 3A, the optical light path of the first partial light beam 32 is of the same length as the optical light path of the second partial light beam 33. Moreover, the paths of both partial light beams within the dichroic component 30 are of the same length. Therefore, an additional element (such as the element 24 in FIG. 2) for balancing different optical path lengths is not required. Moreover, compared with the embodiment in FIG. 2, in the case of such an implementation, if appropriate, the location at which the first partial light beam 32 impinges on the spatial light modulator 36 may be closer to the location at which the second partial light beam 33 is incident on the spatial light modulator 36, with the result that a smaller design of the spatial light modulator 36 is possible. This may lead e.g. to a cost saving. Moreover, both partial light beams are influenced by the same or mutually corresponding optical elements (e.g. the mirrors 34, 35). The light paths of the partial light beams 32, 33 are thus functionally identical, in this case even functionally identical substantially both upstream and downstream of the spatial light modulator.

Figure 3B:
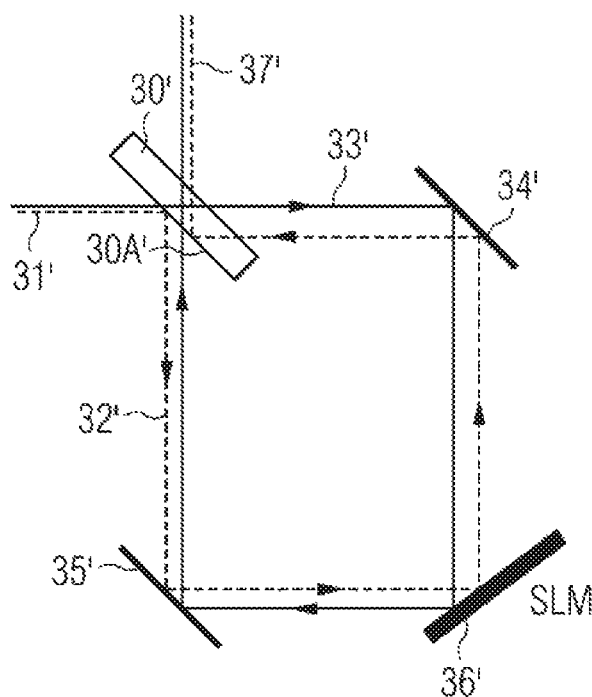
FIG. 3B shows a modulation of the light modulation device from FIG. 3A.

This is achieved with a substantially symmetrical construction in the embodiment in FIG. 3A. In other embodiments, the construction may also be asymmetrical, wherein the light paths of the light beams may still be functionally identical. FIG. 3B shows, as an example thereof, a modulation of the embodiment from FIG. 3A. FIGS. 3A and 3B differ merely in the arrangement of the components and mutually corresponding components are identified by the same reference signs, supplemented by a' in FIG. 3B (e.g. 34 in FIGS. 3A and 34' in FIG. 3B). In FIG. 3B, the dichroic component 30', the mirrors 34', 35' and the spatial light modulator 36' are arranged substantially in a rectangle, wherein the light paths of the partial light beams 32', 33' are functionally identical as in FIG. 3A (apart from possibly different influencing by the light modulator 36'). Asymmetrical arrangements other than the one illustrated in FIG. 3B are also possible.

Figure 4:
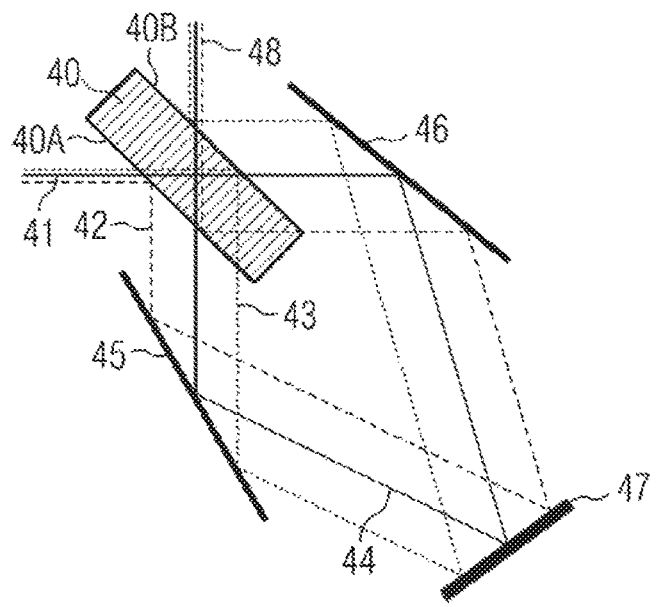
FIG. 4 shows a diagram of a light modulation device in accordance with a further embodiment.

In the embodiments in FIGS. 2 and 3A, 3B an incident light beam is split into two specularly different partial light beams. However, splitting into three or more partial light beams is also possible. FIG. 4 illustrates an embodiment in which an input beam 41 is split into three partial light beams 42 to 44. The basic construction of the embodiment in FIG. 4 corresponds to the embodiment in FIG. 3A. In particular, a mirror 45 in FIG. 4 substantially corresponds to the mirror 35 in FIG. 3A, a mirror 46 in FIG. 4 substantially corresponds to the mirror 34 in FIG. 3A, and a spatial light modulator 47 of the embodiment in FIG. 4 substantially corresponds to the spatial light modulator 36 in FIG. 3A. In contrast to the dichroic component serving as a spectral splitter in FIG. 3A, FIG. 4 has a dichroic spectral splitter which splits the incident light beam 41 into the three partial light beams 42, 43, 44 having different spectral ranges.

For this purpose, the dichroic component 40 has on a first side 40A a first coating, which reflects a spectral range corresponding to the first partial light beam 42 and transmits spectral ranges corresponding to the second partial light beam 43 and the third partial light beam 44. On the second side 40B, the dichroic component 40 has a coating which reflects light corresponding to a spectral range of the second partial light beam 43 and otherwise transmits light (for example corresponding to the spectral ranges of the first partial light beam 42 and of the third partial light beam 44). As a result, as evident from FIG. 4, the first partial light beam 42, the second partial light beam 43 and the third partial light beam 44 are directed to three different locations of the spatial light modulator 47 and can be modulated there separately for example with regard to their phase and/or their amplitude. As illustrated, the beams are then also combined again by the dichroic component 40 to form an output light beam 48. As likewise evident from FIG. 4, the optical path length covered is identical for all the partial light beams 42, 43, 44, with the result that, in this embodiment, too, additional components (such as, for example, the element 24 in FIG. 2) for balancing differences in the optical path lengths are not required. Here, too, the light paths of the partial light beams are functionally identical. Even if FIG. 4 shows a substantially symmetrical arrangement similar to FIG. 3A, an asymmetrical arrangement e.g. corresponding to FIG. 3B is likewise possible here as well.

In this case, in the apparatus in FIG. 4, the first partial light beam 42 and the second partial light beam 43 pass through the apparatus in the anticlockwise direction, and the third partial light beam 44 passes through the apparatus in the anticlockwise direction.

Consequently, in the embodiments in FIGS. 3 and 4—possibly apart from an intended phase manipulation by the spatial light modulator 36 or 47—all the partial light beams have passed through the same optical path.

It should be noted that more than three partial light beams are also possible. For this purpose, for example, a plurality of spectral splitters may be disposed in series in order thus to generate substantially as many individual beams as desired which are then directed to different locations on a spatial light modulator, are manipulated there with regard to phase and/or amplitude and are then recombined.

Figure 5:
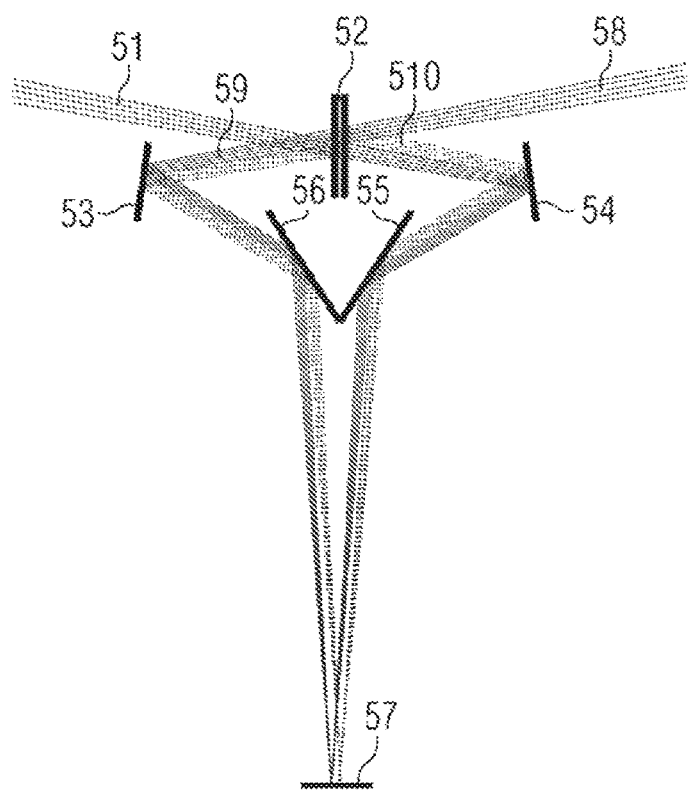
FIG. 5 shows a diagram of a light modulation device in accordance with a further embodiment.

A further embodiment is illustrated in FIG. 5. In the embodiment in FIG. 5, in a manner similar to that in the embodiment in FIG. 3A, an incoming light beam 51 is split into a first partial light beam 59 and a second partial light beam 510 by means of a spectral splitter 52. In this case, the spectral splitter 52 may be implemented substantially like the dichroic component in FIG. 3A. The first partial light beam 59 and the second partial light beam 510 are then directed to different locations on a spatial light modulator 57 and are finally combined again to form an output light beam 58 in the spectral splitter 52, wherein the first partial light beam 59 passes through the apparatus in the anticlockwise direction and the second partial light beam 510 passes through the apparatus in the clockwise direction.

For directing the partial light beams 59, 510, the apparatus in FIG. 5 comprises four mirrors 53, 54, 55 and 56, which are arranged as illustrated. The arrangement is, in particular, once again approximately symmetrical with respect to an axis through the spectral splitter 52 and the spatial light modulator 57. In the embodiment in FIG. 5, the mirrors 53 to 56 are arranged in such a way that the angles of incidence of the beams (measured with respect to the perpendicular as is usual in optics) on the spectral splitter 52 and/or the spatial light modulator 57 are smaller than, for example, in the embodiments in FIGS. 3 and 4. By way of example, with the embodiment in FIG. 5 it is possible to achieve angles of incidence on the spectral splitter 52 and/or the spatial light modulator 57 of less than 20°, preferably less than 10°. This may increase for example the efficiency of the spectral splitter 52 depending on the coating used, which may be important in particular in the case of low signal strength in some applications.

In the case of FIG. 5, too, asymmetrical arrangements are also possible, wherein here owing to the higher number of mirrors there are even more freedoms in the arrangement, while functionally identical light paths are still achievable for the partial light beams.

Figure 6:
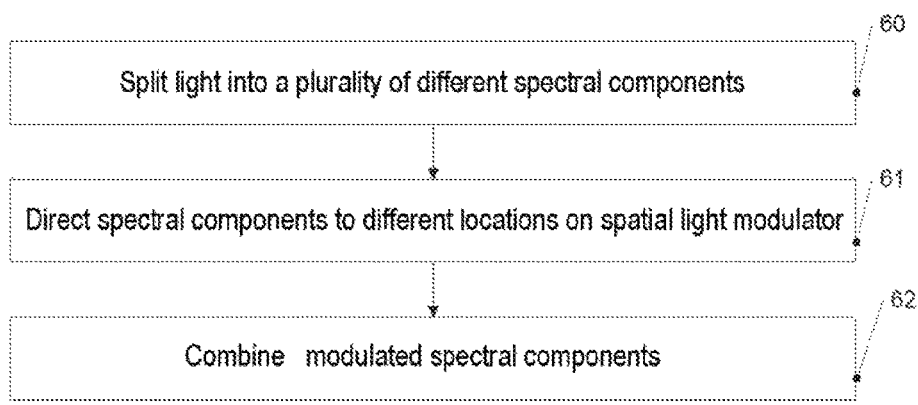
FIG. 6 shows a flow diagram for elucidating a method in accordance with one embodiment.

FIG. 6 shows a flow diagram of a method in accordance with one embodiment. The method in FIG. 6 can be implemented by means of the apparatuses discussed with reference to FIGS. 1 to 5, but can also be implemented independently thereof.

In step 60, a light beam is split into a plurality of partial light beams having different spectral components, for example by means of a dichroic component. In step 61, the different partial light beams are directed to different locations on a spatial light modulator and are modulated there. In step 62, the modulated partial light beams are finally combined again in order to form an output light beam.

Apparatuses and methods as discussed with reference to FIGS. 1 to 6 can be used in various applications. One application example is the multispectral illumination of objects for example for microscopy. A simplified example is illustrated in FIG. 7.

Figure 7:
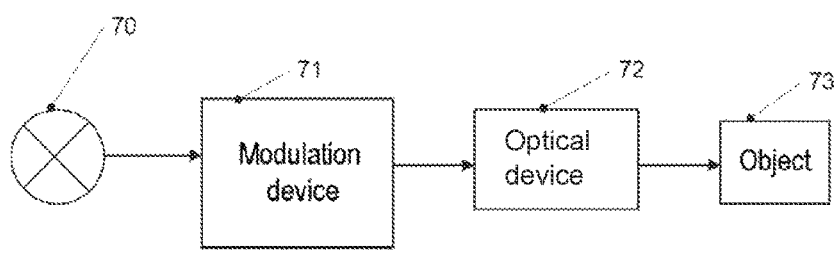
FIG. 7 shows a block diagram of an optical apparatus in accordance with one embodiment.

In the embodiment in FIG. 7, a light source 70 generates a light beam which extends over a relatively wide spectral range. The type of light beam depends on the respective application. The light source 70 may be for example a white light lamp, but also some other light source which emits light in desired spectral ranges. For this purpose, it is also possible to combine a plurality of illuminants, for example a plurality of illuminants of different colours.

The light generated by the light source 70 is fed to a modulation device 71, which may be configured as explained with reference to FIGS. 1 to 5. Here the light is modulated with regard to amplitude and/or phase by means of a spatial light modulator, wherein at least two different spectral components can be modulated independently of one another. The light beam thus modulated is then directed via an optical device 72 onto an object 73. For this purpose, the optical device 72 may comprise for example lenses or mirrors. The object 73 can then be viewed for example by means of a microscope objective (not illustrated). In this case, the illumination device illustrated would be an illumination device for a microscope.

One specific application of this one illumination device of this type is beam shaping for light sheet microscopy. By way of example, a Bessel beam or a Mathieu beam can be formed in particular by a modulation of the phase of different spectral components. Other desired beam shapes (i.e. beam profiles) can also be achieved. This can conventionally take place by means an axicon phase or a binary grating. In this case, however, the phase (axicon phase; i.e. the angle of the cone phase of an axicon used) or else the grating constant of the binary grating is designed for a specific wavelength. If light having a different wavelength is used, for which the axicon or the grating is not exactly designed, then diffraction efficiencies change and the beam is no longer shaped optimally. This would lead to loses of resolution in light sheet microscopy, for example.

The use of an illumination device as shown in FIG. 7 with a modulation device according to the invention, as discussed above, means that light sheet microscopy can then be implemented with a single modulation device even with two, three or more wavelengths simultaneously without loses of quality.

Another application possibility is a different manipulation of an illumination beam and a detected light beam for example in fluorescence microscopy. In fluorescence microscopy, illumination beam and detected light generally have different wavelengths as a result of the Stokes shift. In addition, the detection light may comprise a whole spectrum of different wavelengths. In many fluorescence microscopes, detected light and illumination light beam have a partly shared beam path. Illumination manipulations of these beams with regard to illumination and phase can be performed separately on the illumination light and on the detection light with the apparatuses discussed above in the shared beam path.

These application possibilities merely constitute examples, and the apparatuses and methods discussed can always be used if light in different spectral ranges is intended to be modulated differently with regard to amplitude and/or phase.

The above embodiments serve merely for illustration and should not be interpreted as limiting.

What is claimed is:

1. A modulation device for modulating a light beam, comprising:
    a spectral splitter to split an input light beam into at least two partial light beams having different spectral ranges,
    a spatial light modulator,
    an optical device to direct the at least two partial light beams to different locations of the spatial light modulator,
    wherein the spatial light modulator is configured to modulate the at least two partial light beams,
    wherein the optical device is further configured to direct the at least two partial light beams after modulation from the spatial light modulator to the spectral splitter,
    wherein the spectral splitter is further configured to combine the at least two partial light beams after modulation to form an output light beam,
    wherein at least two of the at least two partial light beams pass through the modulation device in mutually opposite directions; and
    wherein the optical device comprises a first mirror and a second mirror, wherein the at least two partial light beams comprise a first partial light beam and a second partial light beam, wherein the first mirror is arranged to direct the first partial light beam from the spectral splitter to the spatial light modulator and to direct the second partial light beam after modulation from the spatial light modulator to the spectral splitter, wherein the second mirror is arranged to direct the second partial light beam from the spectral splitter to the spatial light modulator and to direct the first partial light beam after modulation from the spatial light modulator to the spectral splitter.

2. The modulation device according to claim 1, wherein the spatial light modulator is configured to modulate amplitude and/or phase of the at least two partial light beams independently of one another.

3. The modulation device according to claim 1, further comprising a component to match optical path lengths of the at least two partial light beams.

4. The modulation device according to claim 1, wherein the modulation device is configured such that optical path lengths for the at least two partial light beams are identical without provision of components for balancing optical path lengths.

5. The modulation device according to claim 1, wherein the first and second mirrors are arranged substantially symmetrically relative to an axis through the spectral splitter and the spatial light modulator.

6. The modulation device according to claim 1, wherein the optical device is configured such that an angle of incidence of the at least two partial light beams on at least one of the spatial light modulator or on the spectral splitter is less than 20°.

7. The modulation device according to claim 6, wherein the angle of incidence is less than 10°.

8. The modulation device according to claim 1, wherein the spectral splitter comprises a dichroic spectral splitter.

9. The modulation device according to claim 8, wherein the spectral splitter comprises on a face thereof a dichroic layer which reflects light in a spectral range and transmits light outside the spectral range.

10. The modulation device according to claim 8, wherein the spectral splitter has a first dichroic layer on a first face thereof and a second dichroic layer on a second face thereof, wherein the first dichroic layer reflects in a different spectral range than the second dichroic layer.

11. The modulation device according to claim 1, wherein light paths of the at least two partial light beams are functionally identical apart from the modulation by the spatial light modulator.

12. The modulation device of claim 1, comprising a light source to generate the input light beam, wherein the modulation device is arranged to illuminate an object.

13. The modulation device according to claim 1, comprised in a microscope apparatus.

14. A method for light modulation, comprising:
splitting light into a plurality of partial light beams having different spectral components,
directing the partial light beams to different locations on a spatial light modulator,
independently modulating the partial light beams by the spatial light modulator, and
combining the modulated partial light beams,
wherein at least two of the partial light beams travel along light paths in opposite directions with respect to said steps of directing and combining, and
wherein the method is carried out with a modulation device comprising a first mirror and a second mirror, wherein the at least two partial light beams comprise a first partial light beam and a second partial light beam, wherein the first mirror is arranged to direct the first partial light beam from the spectral splitter to the spatial light modulator and to direct the second partial light beam after modulation from the spatial light modulator to the spectral splitter, wherein the second mirror is arranged to direct the second partial light beam from the spectral splitter to the spatial light modulator and to direct the first partial light beam after modulation from the spatial light modulator to the spectral splitter.

15. A modulation device, comprising:
a spectral splitter to split an input light beam into at least two partial light beams comprising a first light beam and a second light beam having different spectral ranges,
a spatial light modulator,
a first mirror, and
a second mirror,
wherein the first mirror is arranged to direct the first light beam from the spectral splitter to a first portion of the spatial light modulator and to direct the second light beam after modulation from a second portion of the spatial light modulator to the spectral splitter, the first portion being different from the second portion,
wherein the second mirror is arranged to direct the second light beam from the spectral splitter to the second portion of the spatial light modulator and to direct the first light beam of the modulation from the first portion of the spatial light modulator to the spectral splitter.

16. The modulation device of claim 15, wherein the spectral splitter is a dichroic spectral splitter.

17. The modulation device of claim 1, wherein the first light beam and the second light beam pass through the modulation device in mutually opposite directions based on the optical device having respective optical paths from the spectral splitter to the spatial light modulator and back to the spectral splitter arranged in mutually opposite directions for the first light beam and the second light beam.

18. The method of claim 14, wherein the first light beam and the second light beam pass through the modulation device in mutually opposite directions based on the modulation device having respective optical paths from the spectral splitter to the spatial light modulator and back to the spectral splitter arranged in mutually opposite directions for the first light beam and the second light beam.

* * * * *

UNITED STATES PATENT AND TRADEMARK OFFICE
CERTIFICATE OF CORRECTION

PATENT NO.         : 10,191,292 B2
APPLICATION NO.    : 15/192199
DATED              : January 29, 2019
INVENTOR(S)        : M. Wald et al.

It is certified that error appears in the above-identified patent and that said Letters Patent is hereby corrected as shown below:

In the Specification

Column 4, Line 48, please change "in each" to -- for each --
Column 4, Line 54, please change "mirror 28" to -- mirror 25 --
Column 5, Line 47, please change "lead e.g. to" to -- lead to --
Column 7, Line 66, please change "comprise for example lenses" to -- comprise, for example, lenses --
Column 7, Line 67, please change "viewed for example by" to -- viewed, for example, by --
Column 8, Line 10, please change "means an" to -- means of an --
Column 8, Line 24, please change "loses of" to -- loss of --

Signed and Sealed this
Twenty-first Day of May, 2019

Andrei Iancu
*Director of the United States Patent and Trademark Office*